United States Patent [19]

Carlson et al.

[11] Patent Number: 5,035,166
[45] Date of Patent: Jul. 30, 1991

[54] FIRST FULLY ADJUSTABLE SAWMILL WITH PRECISE RAPID CUT BAND SAW

[75] Inventors: John G. Carlson, La Crescent, Minn.; Larry L. McCumber, La Crosse, Wis.

[73] Assignee: L. J. Manufacturing, Inc., La Crosse, Wis.

[21] Appl. No.: 557,689

[22] Filed: Jul. 25, 1990

[51] Int. Cl.⁵ .................... B27B 13/08; B27B 15/02
[52] U.S. Cl. .................... 83/801; 83/522.17; 83/524; 83/813; 83/818; 144/378
[58] Field of Search ............... 83/809, 801, 813, 818, 83/794, 524, 522.16, 522.17, 522.24; 144/378

[56] References Cited

U.S. PATENT DOCUMENTS

| | | | |
|---|---|---|---|
| 3,374,812 | 3/1968 | McManama | 83/813 X |
| 3,721,146 | 3/1973 | McManama | 83/813 X |
| 3,954,037 | 5/1976 | Rios | 83/794 |
| 4,275,632 | 6/1981 | Ross | 83/794 |
| 4,289,180 | 9/1981 | Weinzierl | 144/378 |
| 4,589,320 | 5/1986 | Kaster | 83/813 X |

OTHER PUBLICATIONS

McDonough sales brochure, author and date unknown.
Paul Bunyan sales brochure, author and date unknown.
Pacific Sawmill sales brochure, author and date unknown.
Min-Max sales brochure, author unknown, drawing dated Feb. 15, 1983.

Primary Examiner—Douglas D. Watts
Assistant Examiner—Clark F. Dexter
Attorney, Agent, or Firm—Robert J. Harter

[57] ABSTRACT

A sawmill includes a band saw mounted on a trolley. The trolley carries the band saw back and forth across the length of a log to cut it into boards. A log supporting table is adjustable to accomodate logs of various size. The trolley rails descend incrementally after each cut to reposition the band saw blade for the next cut. The length of each increment, or board thickness, is user selectable by way of an indexable detent bar and limit switch combination. The thickness across the board is held uniform by a pressurized bellows that maintains the proper blade strain in the band saw blade.

36 Claims, 3 Drawing Sheets

FIRST FULLY ADJUSTABLE SAWMILL WITH PRECISE RAPID CUT BAND SAW

TECHNICAL FIELD

This invention generally pertains to sawmills and more specifically to sawmills having a band saw blade.

BACKGROUND OF THE INVENTION

Existing band type sawmills typically have wheel bearing mounts that are tilted or revolved about an eccentric shaft to tighten the band saw blade. As the bearing mounts move in a nonlinear direction to tighten the blade, the blade can become out of parallel with the log supporting table. In addition, when the bearing mount is repositioned by a threaded adjustment mechanism or a hydraulic cylinder, the wheel bearings become unyielding to fluctuating loads exerted against the blade. Designs such as these in current sawmills can reduce blade life and cause undesirable variations in board thickness.

Some sawmills may only have a log supporting table that is adjustable. Others have a stationary table with only the height of the band saw being adjustable. With either design, however, the ability to effectively clamp logs of various diameter is limited.

In addition, many sawmills are designed to cut boards to only a single thickness.

To avoid the limitations and problems of current sawmills, it is an object of the subject invention to provide a sawmill having both an adjustable height band saw trolley and an adjustable log supporting table to accommodate logs of various diameter.

Another object of the invention is to provide a means for maintaining constant blade strain regardless of variations in blade circumference and band saw wheel spacing.

Another object is to provide a direct acting blade strain device that urges the blade wheels apart in a linear direction, without any intermediate linkage.

Yet another object is to provide a blade strain device that is so compact that it fully fits directly between the blade supporting wheels.

Still another object of the invention is to provide a blade strain device incorporating a hermetically sealed bellows instead of a cylinder to minimize the number of sliding parts that could be susceptible to saw dust contamination.

Yet still another object of the invention is to provide a gas charged blade strain device that is readily separated from its high pressure supply, facilitating its use on a moveable trolley.

A further object is to provide a set works having a single detent bar and a single limit switch, yet being readily indexable to cut boards of eight different thicknesses.

Still yet another object is to incorporate a table position indicator into a sawmill having both an adjustable table and adjustable trolley rails. This enables an operator to readily position the table just prior to the last series of cuts such that the last cut leaves a standard sized board. Previous, more complicated methods require knowing the remaining log thickness and subtracting the cummulative thickness of the boards to be cut plus the width of each cut.

These and other objects will be apparent from the attached drawings and the description of the preferred embodiment that follow below.

SUMMARY OF THE INVENTION

A sawmill includes a band saw mounted on a trolley The trolley carries the band saw back and forth across the length of a log to cut it into boards. A log supporting table is adjustable to accomodate logs of various size. The trolley rails descend incrementally after each cut to reposition the band saw blade for the next cut. The length of each increment, or board thickness, is user selectable by way of an indexable detent arm and limit switch combination. The thickness across the board is held uniform by a pressurized bellows that maintains the proper strain in the band saw blade.

DESCRIPTION OF PREFERRED EMBODIMENT

Figure 1:
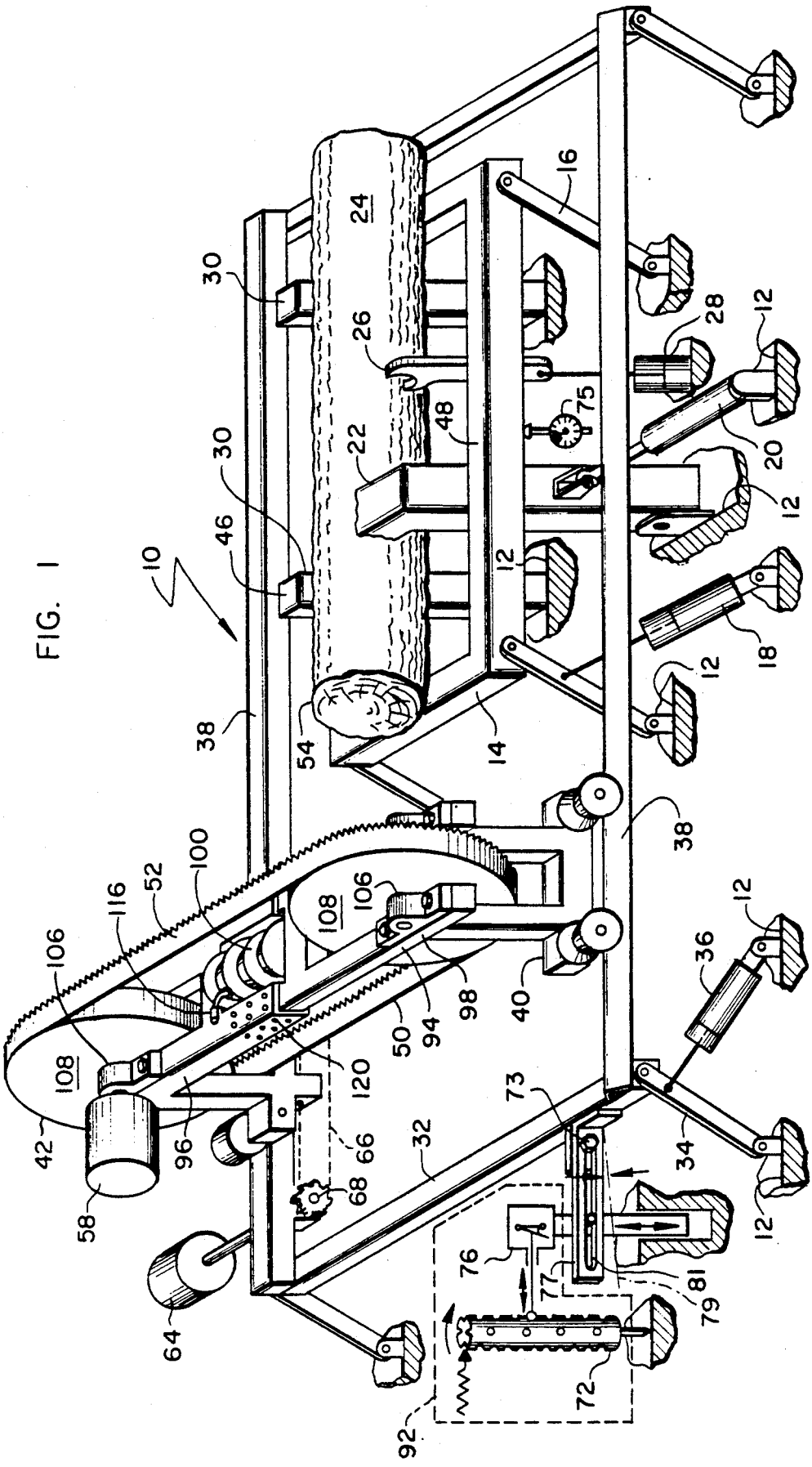
FIG. 1 Illustrates the sawmill according to the subject invention.

FIG. 1 is an overall view of a sawmill 10 according to the subject invention. The basic foundation of sawmill 10 is a frame 12. An adjustable log supporting table 14 is connected to frame 12 by way of several pivoting arms 16. Pivoting arms 16 allow table 14 to be raised or lowered by a first hydraulic cylinder 18. Once moved to a desired elevation, another hydraulic cylinder 20 drives a clamp 22 against a log 24. Clamp 22 forces log 24 against a back stop 30 which is fixed with respect to frame 12. The clamping action holds log 24 fixed with respect to table 14.

Retracting clamp 22, releases log 24, allowing a turn hook 26 to rotate log 24 generally about its longitudinal center line.

Turn hook 26 is driven back and forth through table 14 by a hydraulic cylinder 28. Turn hook 26 has at least one log gripping tooth for gripping and turning log 24. Once turned to the desired position, turn hook 26 retracts out of the way, and clamp 22 once again locks log 24 in place.

Figure 2:
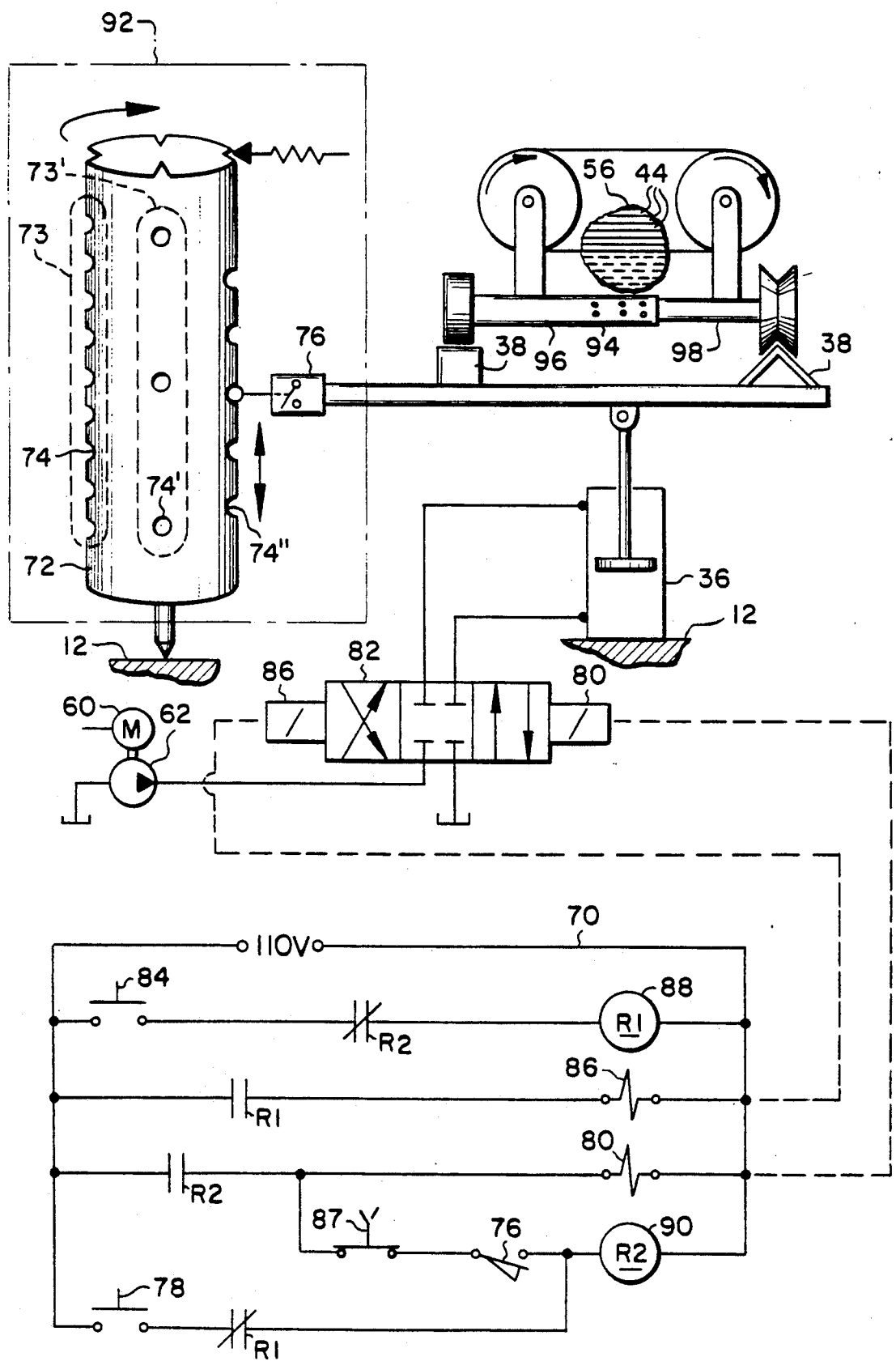
FIG. 2 Illustrates the set works.

A trolley rail assembly 32 is mounted generally around the periphery of table 14, and it also is connected to frame 12 by way of another set of pivoting arms 34. Pivoting arms 34 allow a second hydraulic cylinder 36 to raise and lower trolley rail assembly 32 with respect to table 14. Trolley rail assembly 32 includes two generally parallel rails 38 along which rides a trolley 40. Trolley 40 carries a band saw 42 back and forth along the length of a log 24 to cut it into boards 44 (FIG. 2).

In typical operation, log 24 is placed on table 14. Table 14 is raised or lowered to provide an appropriate elevational difference between the top 46 of back stop 30 and the top 48 of table 14 to suit the diameter of log 24. The smaller the log 24, the higher table 14 is set, generally once table 14 is at the desired elevation, clamp 22 is actuated to hold log 24 in place.

The elevation of rails 38 are then adjusted to align the bottom 50 of the band saw blade 52 near the top 54 of log 24 for the first cut. Trolley 40 carries saw 42 across the length of log 24 to cut the first piece 56 (FIG. 2), then returns saw 42 to its starting position. After each cut, trolley rails 38 descend a distance approximately equal to the desired board thickness (plus blade width of cut) in alignment for a second cut. Repeated cuts are made with trolley rails 38 dropping an increment before each cut.

Usually after several cuts, clamp 22 releases log 24, allowing turn hook 26 to rotate log 24, say 90 or 180 degrees. Clamp 22 locks log 24 in the new position, and band saw 42 is realigned near the top of log 24 for another series of cuts.

Referring to FIG. 1, a position indicator 75 provides a direct readout of the elevational position of table 14. This allows an operator to position table 14 so that after the last series of cuts, the remaining portion of log 24 is of a standard predetermined nominal dimension of, for example, 4" by 4" or 6" by 6".

To further assist the operator in aligning saw blade 52 to log 24, a laser (not shown) is mounted to trolley assembly 32 and aimed at log 24 to illuminate a line along which blade 52 will cut. This can be especially useful since both table 14 and rails 38 are adjustable.

Sawmill 10 receives all its power from an engine driven generator (not shown) attached to frame 12. Band saw 42 is driven by an electric motor 58 that travels with trolley 40. An electric motor 60 (FIG. 2) also drives a hydraulic pump 62 (FIG. 2) for the hydraulic cylinders 18, 20, 28 and 36. As an alternative, however, hydraulic pump 62 could be directly coupled to the same engine driving the generator. An electric motor 64 coupled to trolley 40 by way of a chain 66 and sprocket 68 drives trolley 40 back and forth. A hydraulic motor would be an equivalent substitute for trolley motor 64.

The raising and lowering of trolley rails 38 is adjusted by a unique set works 70 (shown in FIG. 2). In one embodiment of the invention, a detent bar 72 having four rows 73 of marks 74 is connected to frame 12. And a limit switch 76 connected to move with rails 38 engages detent bar 72. The term "limit switch" refers to any position sensor. Just a few examples of a limit switch or position sensor would include, but would not be limited to, an electromechanical switch, electromagnetic pick-up, photoelectric eye, hall effect transducer, proximity switch, conductivity sensor, and laser. The terms "mark" and "marks" refer to any position indicator that would trip limit switch 76 (or position sensor). Just a few examples of a "mark" would include, but would not be limited to, a dimple, protrusion, hole, a spot of ferrous metal, or a spot of magnetic material.

Depressing a down button 78 energizes solenoid-B 80 of valve 82 which lowers rails 38. Rails 38 continue to lower until down button 78 is released, after which rails 38 stop when limit switch 76 reaches the next mark 74. If down button 78 is released between each mark 74, rails 38 will automatically stop at each mark 74. Marks 74 of each row 73 are spaced apart to provide cut boards 44 of a predetermined equal thickness. The up button 84 energizes solenoid-A 86 of valve 82 to raise rails 38 while disregarding any marks 74. This becomes especially useful near the end of each cut. As an added feature, a manual override switch 87 allows downward movement of rails 38 while disregarding any marks 74. Coil-R1 88 and coil-R2 90 represent relay coils whose contacts are labeled accordingly.

FIG. 2 show detent bar 72 connected to frame 12 with limit switch 76 connected to rails 38. As an alternative, detent bar 72 can be connected to rails 38 with limit switch 76 connected to frame 12. Either way, the combination 92 of detent bar 72 and limit switch 76 still serves to sense incremental changes in the position of rails 38.

Detent bar 72 is rotatably indexed with respect to limit switch 76 (i.e., either the detent bar or limit switch is rotatable with respect to the other) to expose a second row 73 of marks 74. The second row 73 of marks 74 are spaced further apart than the first row 73 to provide thicker boards. Any number of additional rows 73 can be added to produce boards 44 of any number of different thicknesses. Detent bar 72 of FIG. 2 has four rows 73 of marks 74. In one embodiment of the invention, detent bar 73 has eight rows 73 of marks 74 circumferentially distributed around bar 72 to produce boards of eight different thicknesses.

In one embodiment of the invention, limit switch 76 is coupled to rails 38 by way of a pivotly adjustable slide arm 77. Slide arm 77 can be pivotted out of coplanar alignment with the top 48 of log supporting table 14. As a starting point, slide arm 77 is locked to a substantially horizontal position, parallel to the top 48 of table 14. After making a few cuts in this position, the board thickness is checked. If the boards are slightly too thick, slide arm 77 is tilted slightly upward about bolt 73 away from phantom line 79 of FIG. 1. Tilting arm 77 upward away from phantom line 79 reduces the board thickness, while tilting arm 77 downward toward phantom line 79 increases the board thickness.

After adjusting the tilt of slide arm 77, bolt 73 is tightened to lock arm 77 in place. For greater rigidity, the distal end of slide arm 77 can be fastened to rail assemby 32 to ensure that arm 77 doesn't move out of alignment while sawing.

In one embodiment of the invention, slot 81 of arm 77 is slightly curved to compensate for the nonlinear motion of pivoting arms 34. However, in another embodiment of the invention, slot 81 is substantially straight and has been found to function very effectively in producing boards of substantially uniform thickness.

To ensure that the cut boards are of uniform thickness across the entire length and width of each board 44, the saw blade tension should be maintained constant. This is accomplished with the subject invention by a slideable bearing mount 94 comprising two rigid telescoping H-frames 96 and 98 incorporating a blade strain bellows 100. One H-frame 98 is fastened to trolley 40 and the other 96 includes two tubes 102 that telescope over, or optionally into, a corresponding set of tubes 104 in the first H-frame to comprise the H-frame assembly 94. Two pair of band saw wheel bearings 106 are attached to opposite ends of the H-frame assembly 94. At least one pair of bearings 106 is adjustably fastened to H-frame assembly 94 to adjust the degree of parallism between the rotational centerlines of both wheels 108. This provides a skew adjustment (indicated by arrow 110) which determines where blade 52 rides on wheels 108.

Figure 3:
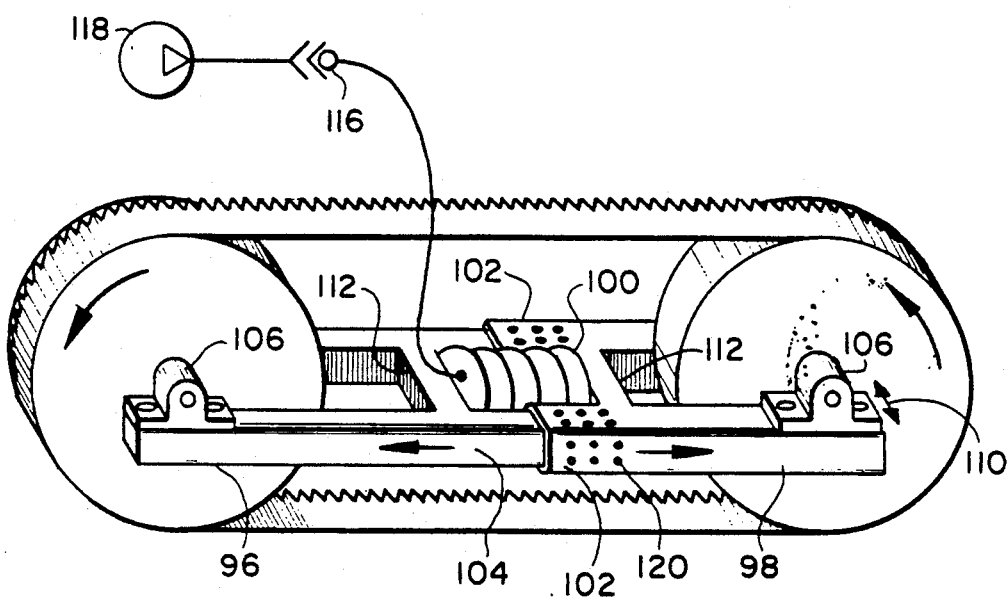
FIG. 3 Is a perspective view of the H-frame assembly and blade strain mechanism.
Figure 4:
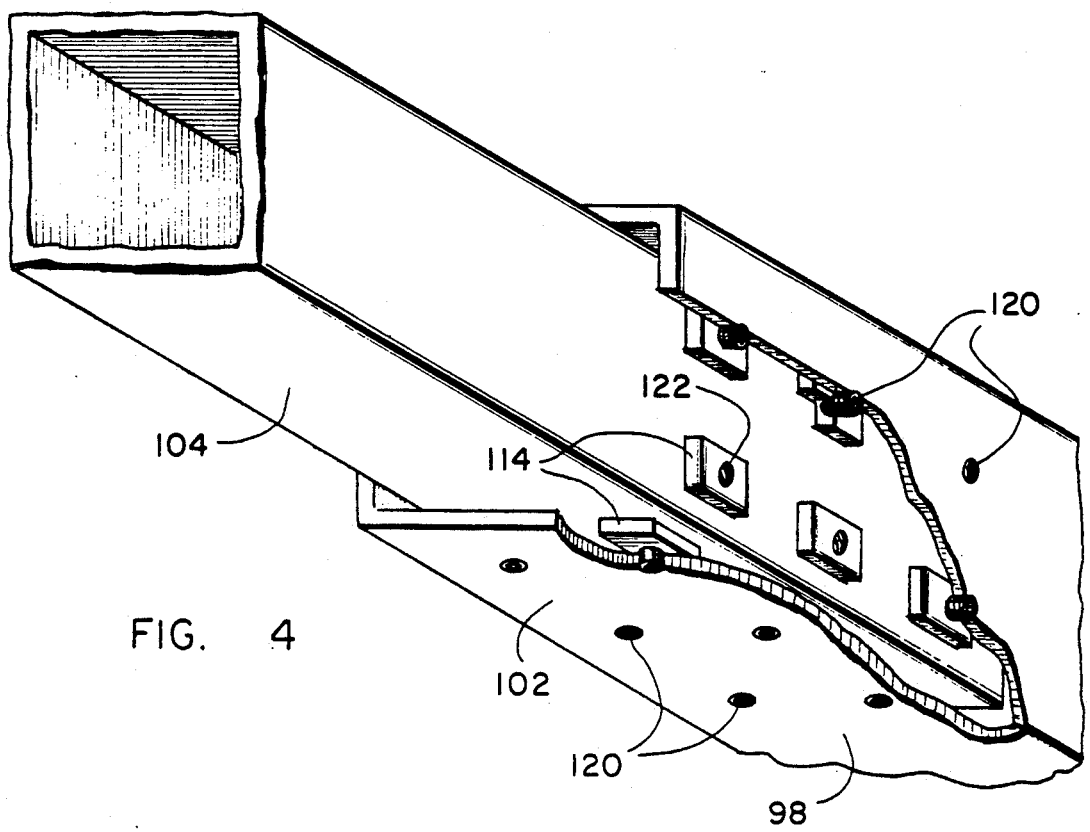
FIG. 4 Is a cut-away perspective of the adjustable gibs used in the H-frame assembly.

Referring to FIG. 3, to keep blade 52 taut, pneumatic bellows 100 is situated between the cross-members 112 of the two H-frames 96 and 98. In one embodiment of the invention, bellows 100 is the same as the lift bag used in lowering the drop axle of many dump trucks. One example of the lift bag is Firestone's part no. 6902. The term "bellows" referred to herein represents any expandable flexible chamber that is hermetically sealed without relying on any sliding seals. When pressurized, bellows 100 urges H-frames 96 and 98 apart to tighten band saw blade 52. Adjustable gibs 114, shown in FIG. 4, ensure that H-frames 96 and 98 slide in a controlled linear direction to ensure that the wheel skew stays properly adjusted. Gibs 114 are held slideably against tube 104 by set screws 120 which thread into tube 102 and fit into dimples 122.

Bellows 100 include a quick connect 116 which allows bellows 100 to be separated from its compressor 118 once pressurized. In one embodiment of the invention, quick connect 116 is a conventional bicycle tire valve e.g., a Schroeder valve. As an alternative, compressor 118 could be left connected to bellows 100 during the sawing operation.

Although the invention is described with respect to a preferred embodiment, modifications thereto will be apparent to those skilled in the art. Therefore the scope of the invention is to be determined by reference to the claims which follow:

We claim:

1. A sawmill for cutting a log into boards, comprising:
    a log supporting table;
    a pair of rails running substantially parallel to the length of said table;
    a trolley mounted to run along the length of said rails;
    a band saw connected to said trolley;
    a hydraulic actuated clamp adapted to hold said log fixed with respect to said table;
    a hydraulic cylinder connected to vary the relative position of said table to that of said rails
    a combination detent bar and a limit switch, one of which is coupled to said rails, said combination defining a first series of incremental changes in the position of said rails, one of the elements of said combination being selectively indexable to further define a second series of incremental changes in the position of said rails, said first and second series of incremental changes corresponding to first and second board thicknesses; and
    a valve controlling the extension of said hydraulic cylinder in response to said limit switch such that substantially all relative motion of said rails stops after each incremental change in the position of said rails, thus allowing said band saw to cut said log after each incremental change.

2. The sawmill as recited in claim 1, wherein said limit switch is connected to move with said rail.

3. The sawmill as recited in claim 1, further comprising a manual override switch connected to selectively disable the function of said limit switch, whereby said rail is free to continue travelling after each incremental change in the position of said rails.

4. The sawmill as recited in claim 3 further comprising, an up switch in series with a coil of a first relay, a down switch in series with a coil of a second relay, said second relay coil being in series with said limit switch and said manual override switch.

5. The sawmill as recited in claim 1, wherein said detent bar is rotably indexable to selectively expose one of four rows of marks to said limit switch.

6. The sawmill as recited in claim 1, further comprising a pivotly adjustable slide arm coupling one of the elements of said combination detent bar and limit switch to said rails.

7. The sawmill as recited in claim 1, wherein said log supporting table and said rails are both hydraulically repositionable with respect to a stationary frame.

8. The sawmill as recited in claim 7, further comprising a position indicator connected to indicate the position of said log supporting table.

9. The sawmill as recited in claim 7, wherein said log supporting table and said rails are connected to said frame by way of a plurality of pivotting arms.

10. The sawmill as recited in claim 1, further comprising two wheels adapted to support a band saw blade therearound, a slidable bearing mount connecting said wheels to said trolley with said wheels being slideably adjustable with respect to each other, and a bellows connected to said bearing mount and positioned between said wheels, said bellows being pressurizable to exert opposing forces against said bearing mount to urge said wheels apart in a substantially linear direction, thereby tightening said band saw blade.

11. The sawmill as recited in claim 10, wherein said bearing mount includes at least two telescoping tubes that maintains a preset degree of parallel alignment of said wheels.

12. The sawmill as recited in claim 11, wherein said tubes include a plurality of adjustable gibs to ensure a predetermined linear alignment of said telescoping tubes.

13. The sawmill as recited in claim 10, further comprising a quick connect coupled to said bellows, whereby a source of pressurized gas can be readily disconnected from said bellows to allow unrestrained travel of said bellows with said trolley.

14. A sawmill for cutting a log into boards, comprising:
    a frame;
    a log supporting table connected to said frame by a first plurality of parallel arms that pivot to allow a first hydraulic cylinder to raise and lower said table with respect to said frame;
    a hydraulic actuated turn hook protruding through said table and adapted to engage and rotate said log;
    a hydraulic actuated clamp adapted to hold said log fixed with respect to said table;
    a pair of rails running substantially parallel to said table and connected to said frame by a second plurality of parallel arms that pivot to allow a second hydraulic cylinder to raise and lower said rails independent of any raising and lowering of said table;
    a trolley mounted to run along the length of said rails;
    a band saw connected to said trolley;
    a limit switch connected to respond to at least one position of said pair of rails; and
    a valve controlling the extension of said second hydraulic cylinder in response to said limit switch such that substantially all relative motion of said rails stops at said one position to allow said band saw to cut said log.

15. The sawmill as recited in claim 14, further comprising a position indicator connected to indicate the position of said log supporting table.

16. The sawmill as recited in claim 14, wherein said limit switch is part of a combination detent bar and limit switch combination, one of which is coupled to said rails, said combination defining a first series of incremental changes in the position of said rails, one of the elements of said combination being selectively indexable to further define a second series of incremental changes in the position of said rails, said first and second series of incremental changes corresponding to first and second board thicknesses, said valve controlling the extension of said hydraulic cylinder in response to said limit switch such that substantially all relative motion of said rails stops after each incremental change in the position of said rails, thus allowing said band saw to cut said log after each incremental change.

17. The sawmill as recited in claim 16, wherein said detent bar is rotatably indexable to selectively expose one of four rows of marks to said limit switch.

18. The sawmill as recited in claim 16, further comprising a manual override switch connected to selectively disable the function of said limit switch, whereby said rails are free to continue travelling after each incremental change in the position of said rails.

19. The sawmill as recited in claim 18, further comprising an up switch in series with a coil of a first relay, a down switch in series with a coil of a second relay, said second relay coil being in series with said limit switch and manual override switch.

20. The sawmill as recited in claim 14, further comprising a pivotly adjustable slide arm coupling one of the elements of said combination detent bar and limit switch to said rails.

21. The sawmill as recited in claim 14, further comprising two wheels adapted to support a band saw blade therearound, a slidable bearing mount connecting said wheels to said trolley with said wheels being slideably adjustable with respect to each other, and a bellows connected to said bearing mount and positioned between said wheels, said bellows being pressurizable to exert opposing forces against said bearing mount to urge said wheels apart in a substantially linear direction, thereby straining said band saw blade.

22. The sawmill as recited in claim 21, wherein said bearing mount includes at least two telescoping tubes that maintains a pre-adjusted degree of parallel alignment of said wheels.

23. The sawmill as recited in claim 22, wherein said tubes include a plurality of adjustable gibs to ensure a predetermined linear alignment of said telescoping tubes.

24. The sawmill as recited in claim 21, further comprising a quick connect coupled to said bellows, whereby a source of pressurized gas can be readily disconnected from said bellows to allow unrestrained travel of said bellows along with said trolley.

25. A sawmill for cutting a log into boards, comprising:
a log supporting table;
a hydraulic actuated clamp adapted to hold said log fixed with respect to said table;
a pair of rails running substantially parallel to the length of said table;
a trolley mounted to run along the length of said rail;
a hydraulic cylinder assembly connected to vary the relative positions of said table and said rails with respect to each other;
two wheels adapted to support a band saw blade therearound;
a slidable bearing mount connecting said wheels to said trolley with said wheels being slideably adjustable with respect to each other;
a bellows connected to said bearing mount and positioned between said wheels, said bellows being pressurizable to exert opposing forces against said bearing mount to urge said wheels apart in a substantially linear direction, thereby tightening said band saw blade;
a limit switch connected to respond to at least one position of said pair of rails with respect to said table; and
a valve controlling the extension of said hydraulic cylinder in response to said limit switch such that substantially all motion of said table stops at said one position to allow said band saw blade to cut said log.

26. The sawmill as recited in claim 25, wherein said bearing mount includes two rigid H-frame assemblies each having at least two telescoping tubes that maintain a pre-adjusted degree of parallel alignment of said wheels.

27. The sawmill as recited in claim 26, wherein saw tubes include a plurality of adjustable gibs to ensure a preadjusted linear alignment of said telescoping tubes.

28. The sawmill as recited in claim 25, further comprising a quick connect coupled to said bellows, whereby a source of pressurized gas can be readily disconnected from said bellows to allow unrestrained travel of said bellows with said trolley.

29. The sawmill as recited in claim 25, wherein said log supporting table and said rails are both hydraulically repositionable with respect to a stationary frame.

30. The sawmill as recited in claim 29, further comprising a position indicator connected to indicate the position of said log supporting table.

31. The sawmill as recited in claim 29, wherein said log supporting table and said rails are connected to said frame by way of a plurality of pivoting arms.

32. The sawmill as recited in claim 25, wherein said limit switch is part of combination detent bar and limit switch combination, one of which is coupled to said rails, said combination defining a first series of incremental changes in the position of said rails, one of the elements of said combination being selectively indexible to further define a second series of incremental changes in the position of said rails, said first and second series of incremental changes corresponding to first and second board thicknesses, said valve controlling the extension of said hydraulic cylinder in response to said limit switch such that substantially all relative motion of said rails stops after each incremental change in the position of said rails, thus allowing said band saw to cut said log after each incremental change.

33. The sawmill as recited in claim 32, wherein said detent bar is rotatably indexable to selectively expose one of four rows of marks to said limit switch.

34. The sawmill as recited in claim 32, further comprising a manual override switch connected to selectively disable the function of said limit switch, whereby said rails are free to continue travelling after each incremental change in the position of said rails.

35. The sawmill as recited in claim 34, further comprising an up switch in series with a coil of a first relay, a down switch in series with a coil of a second relay, said second relay coil being in series with said limit switch and said manual override switch.

36. The sawmill as recited in claim 32, further comprising a pivotly adjustable slide arm coupling one of the elements of said combination detent bar and limit switch to said rails.

* * * * *